United States Patent
Sadeck (12)

(10) Patent No.: US 9,145,211 B1
(45) Date of Patent: Sep. 29, 2015

(54) METHOD OF IMPROVED LOAD DISTRIBUTION OVER THE SURFACE OF A PARACHUTE CANOPY

(71) Applicant: The United States of America as Represented by the Secretary of the Army, Washington, DC (US)

(72) Inventor: James E. Sadeck, East Freetown, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/623,862

(22) Filed: Feb. 17, 2015

Related U.S. Application Data

(62) Division of application No. 13/625,232, filed on Sep. 24, 2012, now Pat. No. 8,985,520.

(51) Int. Cl.
*B64D 17/02* (2006.01)
*B64D 17/24* (2006.01)
*B64D 17/14* (2006.01)

(52) U.S. Cl.
CPC ............... *B64D 17/24* (2013.01); *B64D 17/14* (2013.01)

(58) Field of Classification Search
CPC ........ B64D 17/02; B64D 17/14; B64D 17/16; B64D 17/24; B64D 17/26; B64D 17/28
See application file for complete search history.

(56) References Cited

U.S. PATENT DOCUMENTS

| | | | | |
|---|---|---|---|---|
| 1,485,400 | A * | 3/1924 | Lucas | 244/145 |
| 1,862,247 | A * | 6/1932 | Tricau | 244/145 |
| 2,581,808 | A * | 1/1952 | Moran | 244/145 |
| 3,055,621 | A * | 9/1962 | Martin | 244/142 |
| 6,328,262 | B1 * | 12/2001 | Sadeck et al. | 244/142 |
| 6,328,263 | B1 | 12/2001 | Benney et al. | |
| 7,000,872 | B1 | 2/2006 | Fujiwara et al. | |
| 7,028,951 | B1 | 4/2006 | Sadeck | |
| 2011/0290944 | A1 | 12/2011 | Sadeck et al. | |

* cited by examiner

*Primary Examiner* — Philip J Bonzell
(74) *Attorney, Agent, or Firm* — Roger C. Phillips

(57) ABSTRACT

A parachute canopy system includes a canopy having a skirt and a suspension line system, where each suspension line of the suspension line system is attached to the skirt. A pair of first line members is attached to the canopy, the pair of first line members extending in a substantially radial direction away from the skirt towards a center of the canopy. A first end of each line member in the pair of first line members is connected together to the suspension line at the skirt. A first end of the second line member is connected to adjacent second ends of adjacent pairs of first line members that extend towards the center of the canopy.

12 Claims, 2 Drawing Sheets

METHOD OF IMPROVED LOAD DISTRIBUTION OVER THE SURFACE OF A PARACHUTE CANOPY

STATEMENT OF GOVERNMENT INTEREST

The invention described herein may be manufactured and used by or for the U.S. Government for governmental purposes without the payment of any royalties thereon or therefor.

FIELD

The aspects of the present disclosure relate generally to the field of parachute canopies, and in particular to load distribution over the surface if a parachute canopy.

BACKGROUND

Parachutes are commonly used to deliver cargo and supplies to area generally inaccessible by vehicle transport as well as to quickly supply military troops. Materials with high strength-to-weight ratios are standard for parachute design and construction.

Referring to FIG. 1, a plan view of a flat, circular parachute canopy system 100 of the prior art is illustrated. A typical parachute system 100 will include a canopy 112 that has a canopy skirt 108. The parachute system 100 will also include suspension lines 106 that are attached to the canopy 112 and a payload (not shown). Typical parachute canopies have suspension tapes 102 that radiate outward from the center 114 of the canopy 112. The canopy 100 includes radial suspension tapes 102 that are sewn or stitched to the canopy material 104. Attached to the suspension tapes 102 are the suspension lines 106 that support the payload (not shown). The suspension lines 106 are attached at the skirt 108 of the canopy material 104 at attachment points 110. While these suspension tapes 102 distribute the payload weight evenly over the canopy surface, they create stress in the canopy material 104. This can be evidenced by scalloping in the canopy material 104 when the parachute canopy 100 is inflated. It would be advantageous to be able to reduce the stress in the material of a parachute canopy 100 caused by the suspension tapes 102.

Accordingly, it would be desirable to provide a parachute canopy system that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a parachute canopy system. In one embodiment, the parachute canopy system includes a canopy having a skirt and a suspension line system, where each suspension line of the suspension line system is attached to the skirt. A pair of first line members is attached to the canopy, the pair of first line members extending in a substantially radial direction away from the skirt towards a center of the canopy. A first end of each line member in the pair of first line members is connected together to the suspension line at the skirt. A first end of the second line member is connected to adjacent second ends of adjacent pairs of first line members that extend towards the center of the canopy.

Another aspect of the exemplary embodiments relates to a parachute canopy system. In one embodiment, the parachute canopy system includes a canopy having a skirt, a suspension line system attached to the skirt, a junction point on the skirt, a pair of first lines attached to the canopy and extending in a substantially radial direction away from the skirt towards a center portion of the canopy, a first end of each pair of first lines being connected together and to the suspension line at the junction point on the skirt, a second line member, a first end of the second line connected to the center portion of the canopy and a second end of the second line member connected to adjacent second ends of adjacent pairs of first line members.

A further aspect of the exemplary embodiments relates to a parachute canopy system. In one embodiment, the parachute canopy system includes a peripheral canopy having a vent and a skirt, a suspension line system connected at one end to a junction point on the skirt, a pair of first line members attached to the canopy, one end of the pair of first line members connected to the junction point, the pair of first line members extending in a substantially radial direction away from the junction point on the skirt towards the vent, an other end of each first line member in the pair of first line members being connected to a junction point on the vent, a second line member having one end connected to the junction point on the vent, an other end of each second line member connected to a point on each suspension line away from the one end connected to the junction point on the skirt.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION OF THE EXEMPLARY EMBODIMENTS OF THE DISCLOSURE

Figure 1:
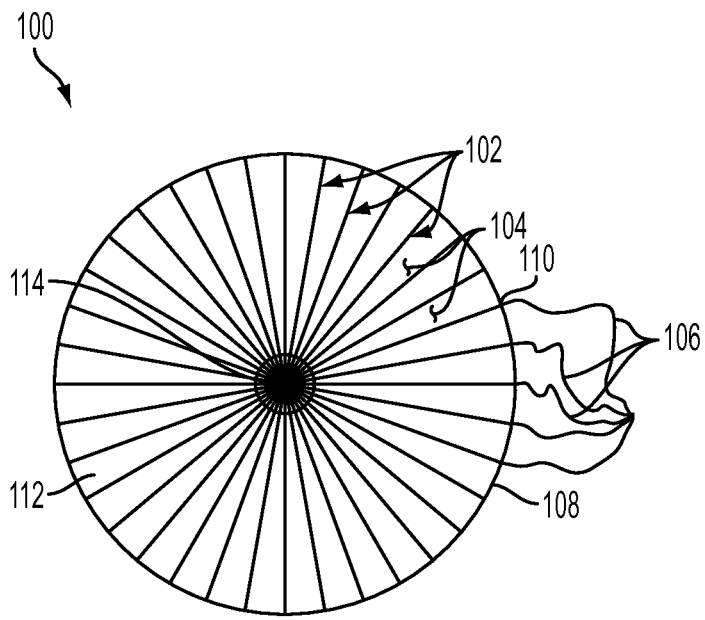
FIG. 1 illustrates a plan view of a flat parachute canopy system of the prior art.
Figure 2:
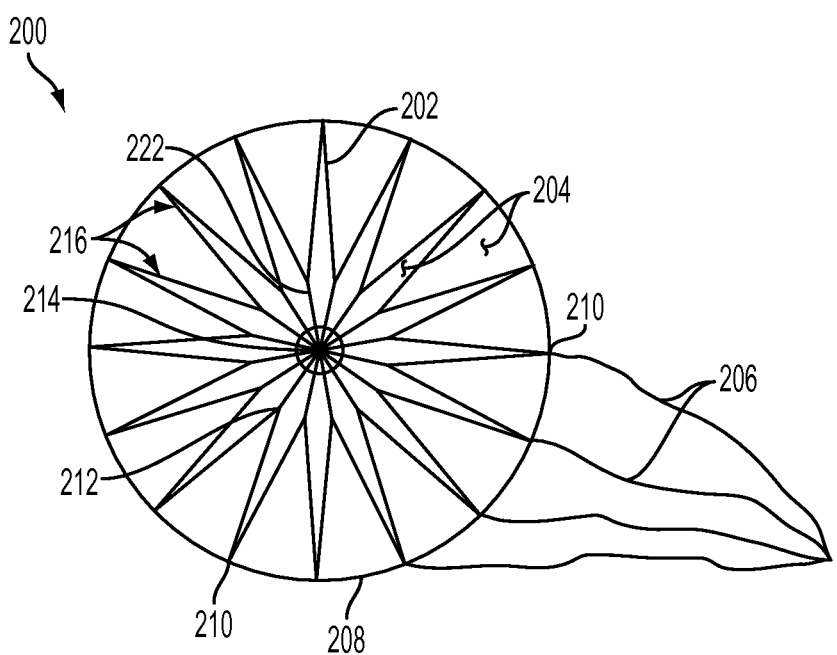
FIG. 2 illustrates a plan view of one embodiment of a parachute canopy system incorporating aspects of the present disclosure.

Referring to FIG. 2, an exemplary parachute canopy system incorporating aspects of the present disclosure is generally designated by reference numeral 200. The aspects of the disclosed embodiments reduce the stress in the canopy material caused by the suspension lines by dividing the forces transmitted by the suspension lines to the radial suspension tapes.

FIG. 2 illustrates a flat, substantially circular parachute canopy 200. Each suspension line 206 is attached or connected to a first line member 202 at the skirt 208. The line member 202 can generally comprise a radial suspension line or load bearing line or tape member. In one embodiment, the attachment of the suspension line 206 to first line member 202 is at the junction or attachment point 210 on the skirt 208. Typically, the attachment of a suspension line 206 to a first line member 202 is by sewing or stitching, as is generally understood. The one end of each of the first line members 202 intersect one another at the junction point 210 of the skirt 208.

As shown in FIG. 2, there are a plurality of pairs 216 of first line members 202 on the canopy 200. Each first line member 202 in each pair 216 extends away from the junction points 210 in a substantially "V" shape form. In one embodiment, the angle formed between each first line member 202 in the pair 216 is in the range of approximately 5 degrees to and including 60 degrees, depending upon the particular application. The other ends of adjacent first line members 202 in adjacent pairs 216 will intersect as shown in FIG. 2 at attachment point 212.

In the embodiment shown in FIG. 2, a second line member 222 is connected to the intersection of the adjacent first line members in adjacent pairs 216. As shown in FIG. 2, this intersection at attachment point 212 occurs near on an apex of the center region 214 of the parachute canopy 200.

The intersection of the first line members 202 at the attachment points 210 divides the suspension line load between each other. This division of forces reduces the stress in the canopy material 204 during, for example, high force opening, the inflation process when payload deceleration occurs or during steady descent.

Figure 3:
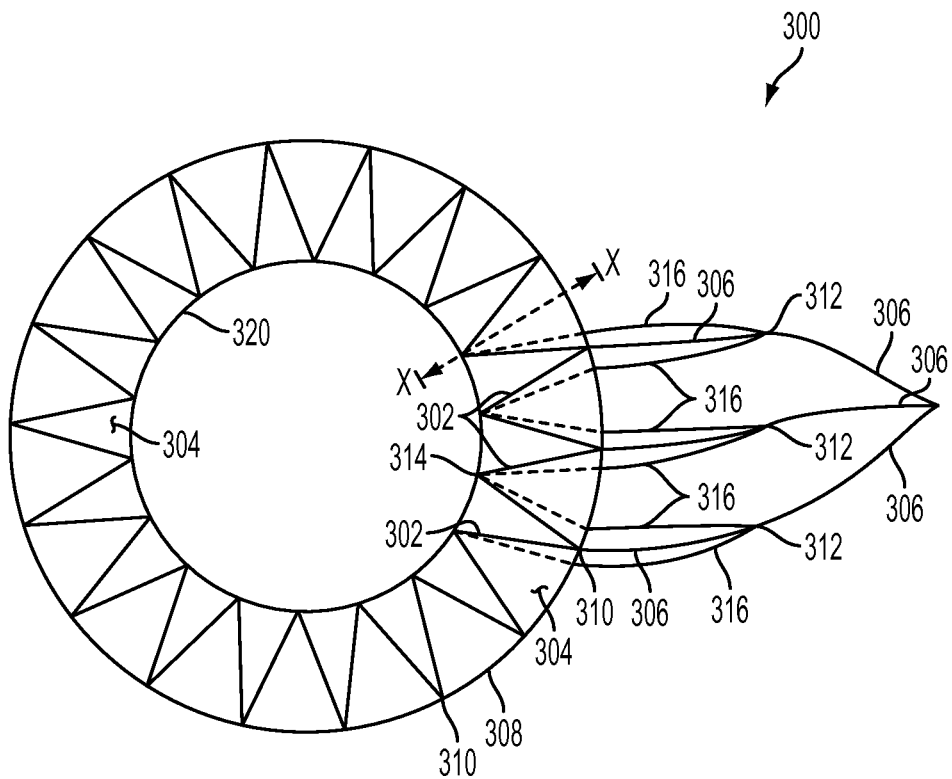
FIG. 3 illustrates a plan view of another embodiment of a parachute canopy system incorporating aspects of the present disclosure.

FIG. 3 illustrates another embodiment of the aspects of the present disclosure as applied to an annular style parachute canopy 300. In this embodiment, the annular parachute canopy 300 includes a generally large vent 302. The suspension line system includes main suspension lines 306 that attached at the skirt 308. These suspension lines or tapes can be load bearing. The suspension system also includes second line members or suspension lines 316, also referred to as vent lines, that are connected at one end to the vent 320 and an other end to the main suspension lines 306 at point 312. The second line member 316 can also be load bearing line members or tapes. The point 312 is generally away from the skirt 308 at a distance that is dependent upon or a function of the diameter of the canopy 300. The second line members 316 are connected to the main suspension lines 306 in any suitable manner, such as sewing or stitching, for example.

In one embodiment, a first line member 302, also referred to as a load bearing tape, is stitched to the canopy material 304. One end of the vent lines 316 are attached at junction points 314 at vent 320. The main suspension lines 306 are attached at junction point 310 at skirt 308. The attachments or connections generally described herein can be in any suitable form, including, but not limited to, stitching.

Figure 4:
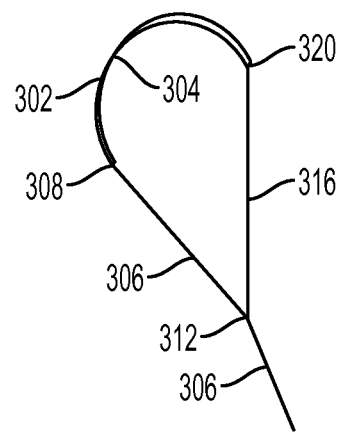
FIG. 4 illustrates a cross-sectional view of a portion of the parachute canopy system depicted in FIG. 3.

FIG. 4 is a partial cross-sectional or cut away view of the inflated annular ring parachute canopy 300 taken along the line X-X of FIG. 3. As illustrated in FIGS. 3 and 4, the forces transmitted from the main suspension lines 306 are divided into three components at junction point 312. These three components are further divided at the junction point 310 to the skirt 308 and the junction point 314 to the vent 320 of the annular canopy 300 by the load bearing lines or tapes 302. The particular configuration of the load bearing lines or tapes 302 improve load distribution over the canopy material 304, reducing the stress concentration in the canopy material 304.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A parachute canopy system, comprising:
   a canopy having a skirt;
   a suspension line system, each suspension line of the suspension line system being attached to the skirt;
   a pair of first line members attached to the canopy, the pair of first line members extending in a substantially radial direction away from the skirt towards a center of the canopy, a first end of each line member in the pair of first line members being connected together to the suspension line at the skirt;
   a second line member, a first end of the second line member connected to adjacent second ends of adjacent pairs of first line members that extend towards the center of the canopy.

2. The parachute canopy system of claim 1, wherein a second end of the second line member is connected to a junction point in an apex area of the center of the canopy.

3. The parachute canopy system of claim 2, wherein the first line members and second line members are stitched along their lengths to the canopy.

4. The parachute canopy system of claim 1, comprising a junction point on the skirt, wherein the first end of each pair of line members in the pair is connected together at the junction point on the skirt together with a suspension line of the suspension line system.

5. The parachute canopy system of claim 4, wherein each line member in the pair of first line members extends away from the junction point on the skirt at an angle relative to each other towards the center portion of the canopy.

6. The parachute canopy system of claim 5, wherein the angle is in the range of approximately 5 degrees to and including 30 degrees.

7. The parachute canopy system of claim 5, wherein the adjacent second ends of adjacent pairs of first line members intersect with each other.

8. The parachute canopy system of claim 7, wherein intersecting second ends of adjacent pairs of first line members are stitched together with the first end of the second line member and the canopy.

9. The parachute canopy system of claim 7, wherein the intersecting second ends of the pair of first line members terminate on the canopy at a pre-determined distance from the center portion of the canopy.

10. The parachute canopy system of claim 1, comprising a vent and wherein the first end of the second line member and second ends of adjacent pairs of first line members are connected to the vent.

11. The parachute canopy system of claim 10, wherein a second end of each second line member is connected to a suspension line of the suspension line system at a connection point away from the skirt.

12. The parachute canopy system of claim 1, wherein the pair of first line members and the second line member are load bearing members.

* * * * *